United States Patent
Guangxi et al.

(10) Patent No.: US 7,551,793 B2
(45) Date of Patent: Jun. 23, 2009

(54) METHODS AND APPARATUSES FOR ADAPTIVE LOOP FILTERING FOR REDUCING BLOCKING ARTIFACTS

(75) Inventors: Zhu Guangxi, Wu Han (CN); Wen Qiang, Wu Han (CN); Tian Xiaohua, Wu Han (CN); Jin Xin, Wu Han (CN); Liu Wenyu, Wu Han (CN); Yu Li, Wu Han (CN); Wang Yao, Wu Han (CN)

(73) Assignees: Samsung Electronics Co., Ltd., Suwon-si (KR); Huazhong University of Science & Technology, Wu Han (CN)

( * ) Notice: Subject to any disclaimer, the term of this patent is extended or adjusted under 35 U.S.C. 154(b) by 815 days.

(21) Appl. No.: 11/035,066

(22) Filed: Jan. 14, 2005

(65) Prior Publication Data

US 2005/0196063 A1    Sep. 8, 2005

(30) Foreign Application Priority Data

Jan. 14, 2004   (CN) .................. 2004 1 0012658
Jan. 12, 2005   (KR) ................... 10-2005-0002802

(51) Int. Cl.
G06K 9/36   (2006.01)

(52) U.S. Cl. ..................................... 382/261; 382/268

(58) Field of Classification Search .................. 382/236, 382/251–253, 261, 268, 275, 260, 269; 375/E7.135, 375/E7.162, 240.24, 240.29
See application file for complete search history.

(56) References Cited

U.S. PATENT DOCUMENTS

| | | | |
|---|---|---|---|
| 5,974,197 A * | 10/1999 | Lee et al. ..................... | 382/268 |
| 6,259,823 B1 * | 7/2001 | Lee et al. ..................... | 382/268 |
| 6,631,162 B1 * | 10/2003 | Lee et al. ................ | 375/240.16 |
| 2001/0003545 A1 * | 6/2001 | Hong ......................... | 382/268 |
| 2001/0017944 A1 * | 8/2001 | Kalevo et al. ............... | 382/268 |
| 2002/0136303 A1 * | 9/2002 | Sun et al. ............... | 375/240.16 |
| 2003/0020835 A1 * | 1/2003 | Petrescu ..................... | 348/625 |
| 2003/0190086 A1 * | 10/2003 | Kim .......................... | 382/275 |
| 2005/0036697 A1 * | 2/2005 | Shim et al. .................. | 382/233 |

* cited by examiner

*Primary Examiner*—Andrew W Johns
(74) *Attorney, Agent, or Firm*—Sughrue Mion, PLLC

(57) ABSTRACT

A loop filtering method and apparatus are provided. The loop filtering method includes: calculating blocking effect strength based on coding type information, which specifies the coding type of a block to be filtered, a motion vector of the block, and reference frame information, which identifies a reference frame; determining a filtering unit to be used for filtering the block based on the calculated blocking effect strength; and performing filtering on the block using the determined filtering unit. Accordingly, it is possible to provide high-quality HDTV images by determining whether to perform loop filtering and adjusting the degree of loop filtering in consideration of the characteristics of HDTV images.

17 Claims, 4 Drawing Sheets

METHODS AND APPARATUSES FOR ADAPTIVE LOOP FILTERING FOR REDUCING BLOCKING ARTIFACTS

BACKGROUND OF THE INVENTION

This application claims priority from Chinese Patent Provisional Application No. 200410012658.0, filed on Jan. 14, 2004, and Korean Patent Application No. 10-2005-0002802, filed on Jan. 12, 2005, in the Korean Intellectual Property Office, the disclosures of which are incorporated herein in their entirety by reference.

1. Field of the Invention

The present invention relates to video coding, and more particularly, to a loop filtering method and a loop filter.

2. Description of the Related Art

In video coding, an image is divided into blocks for processing. During such video coding, a blocking effect and a ringing effect may occur after a discrete cosine transform (DCT) and quantization are performed. The degrees of the blocking effect and the ringing effect are different in each block.

Typical problems caused by the blocking effect are grid noise and staircase noise. Such noise causes a detectable edge of an image and may even cause a block border to appear. The ringing effect may bring about a loop effect in a region ranging from the upper left portion to the lower right portion of the image, which results in the appearance of a plurality of images overlapping each other.

The blocking effect is usually caused by a quantization error that occurs when quantization is performed in each block. When the blocking effect occurs, two forms, i.e., grid noise and staircase noise, having different image contents appear in a single block region.

Staircase noise appears at a strong edge of an image. Since a large number of high-frequency coefficients in DCT are quantized to zero, the strong edge cannot be perfectly converted into a digital format in a transform field. In addition, since an image is processed in block units during video coding, continuity of the strong edge is not secured at a block boundary. As a result, sawtooth noise occurs at the strong edge of the image and an unnatural edge of a data block referred to as staircase noise appears.

Grid noise appears in a flat area of an image. Since rounding off is performed in the flat area of the image where brightness gradually increases or decreases during quantization, a direct current (DC) coefficient in a region where DCT is performed may exceed a determination thresholds value used to determine an adjacent quantization level, which may cause a sudden difference in brightness between two adjacent blocks of an image to be reconstructed. As a result, a profile referred to as grid noise visually appears as a strip shape.

To eliminate the blocking effect and ringing effect, it is necessary to remove the blocking effect from an image before the image is encoded or stored as a reference frame for a subsequent frame.

A loop filter reduces a blocking effect and a ringing effect during image encoding. A loop filter can reduce a blocking effect and partially remove a ringing effect. A loop filter achieves this by performing smooth filtering on values of pixels between adjacent pixels on opposite sides of a block boundary. Such a loop filtering algorithm has been combined with one of the latest international standards H.264.

However, conventional loop filtering is performed without considering the characteristics (e.g., characteristic edges) of an image at a block boundary, and therefore, is not suitable for high-definition digital TV which has a high resolution and a high bit rate. In other words, in high-definition digital TV, a large change occurs at a block boundary and it is necessary to not perform loop filtering or to slightly perform loop filtering sometimes. The conventional loop filtering does not consider these factors at all.

In particular, China started to design its own international video and audio coding standards in 2002. These standards include a video coding standard for high-definition digital TV (i.e., HDTV) under discussion. Accordingly, the conventional loop filtering is not appropriate for coders utilizing Chinese digital audio and video coding standards.

SUMMARY OF THE INVENTION

The present invention provides a loop filtering method and a loop filter, by which the execution or non-execution of loop filtering is determined and the degree of loop filtering is adjusted according to the characteristics of a high-definition TV (HDTV) image so that a HDTV image is reproduced in as good of quality as possible.

According to an aspect of the present invention, there is provided a loop filtering method comprising: calculating blocking effect strength based on coding type information, which specifies the coding type of a block to be filtered, a motion vector of the block, and reference frame information, which identifies a reference frame; determining a filtering unit to be used for filtering the block based on the calculated blocking effect strength; and performing filtering on the block using the determined filtering unit.

According to another aspect of the present invention, there is provided a loop filtering method comprising: calculating a difference between the values of adjacent pixels on one side of a block boundary; determining whether the difference is larger than a threshold value; and performing loop filtering if the difference is larger than the threshold value, wherein the threshold value is determined by a user based on whether characteristic edges are located along the block boundary.

According to another aspect of the present invention, there is provided a loop filtering apparatus comprising: a blocking effect strength calculating portion calculating blocking effect strength based on coding type information, which represents a coding type, a motion vector, and reference frame information for identifying a reference frame; a selecting portion selecting a type of filtering to perform based on the blocking effect strength; and a filtering portion performing the selected type of filtering.

According to another aspect of the present invention, there is provided a loop filtering apparatus comprising: a differential pixel value calculating portion calculating a difference in the values of adjacent pixels located on opposite two sides of a block boundary; a filtering determining portion determining whether or not the difference is greater than a threshold value and generating a filtering determining signal; and a filtering portion performing loop filtering only if the filtering determining signal is a first type, wherein the threshold value is set by a user according to whether or not a characteristic edge exists on the block boundary.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS THE INVENTION

The present invention will now be described more fully with reference to the accompanying drawings in which exemplary embodiments of the invention are shown.

Figure 1:
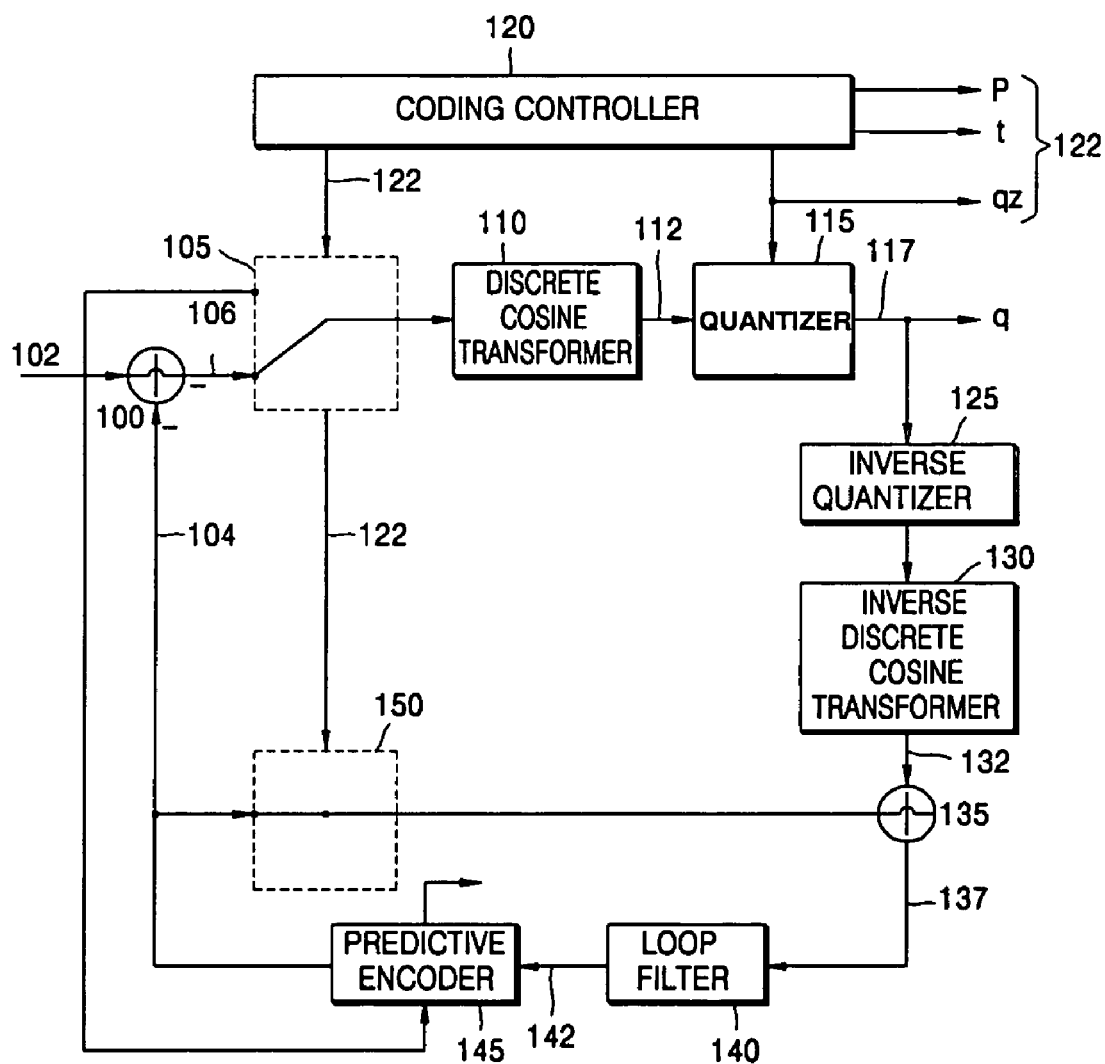
FIG. 1 is a block diagram of a video encoder.

FIG. 1 is a block diagram of a video encoder. The location of a loop filter 140 in the video encoder and the functions of the loop filter 140 will be described first in the following paragraphs with reference to FIG. 1 in order to make a loop filtering method according to the present invention and the operation of the loop filter 140 more clearly understood. Referring to FIG. 1, a video signal 102 is input to a subtractor 100, a first switch 105, and a predictive encoder 145.

The subtractor 100 generates a predictive error 106 by subtracting a forward predictive value 104 (i.e., motion predictive error signal) from the input video signal and provides the predictive error 106 to the first switch 105.

The first switch 105 selects one of the predictive error 106 and the input video signal 102 in response to a switch control signal 122 of a coding controller 120 and provides the selected signal to a discrete cosine transformer 110.

The discrete cosine transformer 110 generates a transformation coefficient 112 by performing discrete cosine transformation (DCT) on the signal provided by the first switch 105.

A quantizer 115 generates a transformation coefficient level 117 by quantizing the transformation coefficient 112. The transformation coefficient level 117 is transmitted to a video decoder (not shown) via a transmission channel, decoded and then reproduced.

In the video encoder, the transformation coefficient level 117 is input to an inverse quantizer 125 and an inverse discrete cosine transformer 130.

A signal 132 output from the inverse discrete cosine transformer 130 and the forward predictive value 104 transmitted via a second switch 150 are summed up by an adder 135, thereby restoring an in-loop video signal 137. The in-loop video signal 137 is input to the loop filter 140.

The loop filter 140 generates a noise-filtered signal 142 by performing smooth filtering on the in-loop video signal 137. Signal distortion caused by quantization accumulates in a memory of the video encoder. High frequency components, in particular, lower prediction efficiency and thus considerably deteriorate the quality of pictures. The loop filter 140 reduces such signal distortion. The loop filter 140 is a low-pass filter and generally performs filtering in units of blocks. However, the loop filter 140 may perform filtering in units of macroblocks at the request of a user. The noise-filtered signal 142 is a signal with blocking effects and ringing effects removed therefrom.

The predictive encoder 145 receives the noise-filtered signal 142 and generates the forward predictive value 104 by performing forward prediction on the noise-filtered signal 142.

The forward predictive value 104 is provided to the subtractor 100 and the second switch 150.

The second switch 150 is controlled by the coding controller 120 using the switch control signal 122.

The coding controller 120 controls the second switch 150 so that the second switch 150 processes a signal input thereto to be compatible with an inter-coding method, rather than an intra-coding method, and then provides the processed signal to the adder 135.

The coding controller 120 generates video coding information 124. The video coding information 124 is transmitted to the video decoder together with the transformation coefficient level 117. The video coding information 124 includes a coding type identification flag bit P, which specifies the type of coding (inter-coding or intra-coding), quantization characteristics information qz, and a transmission or non-transmission identification flag t.

Figure 2:
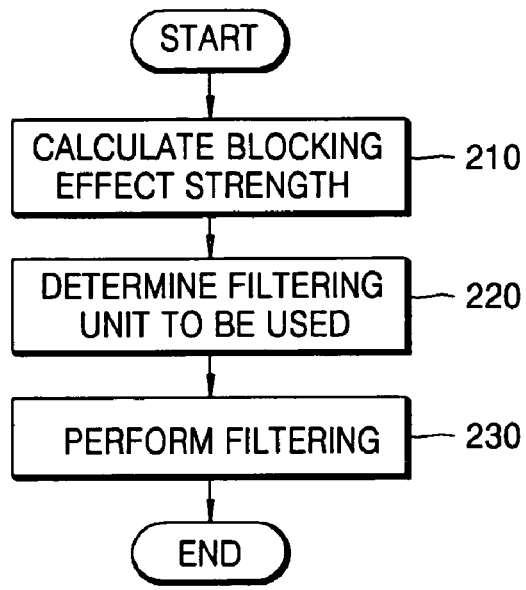
FIG. 2 is a flowchart of a loop filtering method according to an exemplary embodiment of the present invention.

FIG. 2 is a flowchart of a loop filtering method according to an exemplary embodiment of the present invention. Referring to FIG. 2, suppose that blocks have a size of 8×8. In operation 210, blocking effect strength is calculated based on coding type information, which specifies the coding type of a current block to be filtered and the type of a macroblock to which the current block belongs, a motion vector of the current block, and reference frame information, which identifies a reference frame.

The blocking effect strength is calculated in operation 210 according the following method.

① If one or two blocks in a 8×8 block on each side of a block boundary are intra-prediction blocks, i.e., if the coding type information specifies intra-coding, the blocking effect strength is 2.

② If at least one of the following conditions is met, the blocking effect strength is 1:

a. the two 8×8 blocks on each side of the block boundary use different reference frames, which are image frames referred to in inter-coding; and b. the two 8×8 blocks on each side of the block boundary use the same reference frame, but a difference of components among two motion vectors is larger than a complete pixel value.

③ If none of ① and ② is satisfied, the blocking effect strength is 0.

In operation 220, a filtering unit to be used for filtering the current block is determined based on the blocking effect strength calculated in operation 210. Specifically, if the blocking effect strength is 2, i.e., if the blocking effect is distinctive, strong filtering, such as average filtering, must be performed. If the blocking effect strength is 1, i.e., if the blocking effect is less distinctive, weak filtering, such as differential filtering, may be performed. If the blocking effect strength is 0, i.e., if no blocking effect is visually detected, filtering does not need to be performed.

In operation 230, filtering is performed using the filtering unit determined in operation 220.

Figure 3:
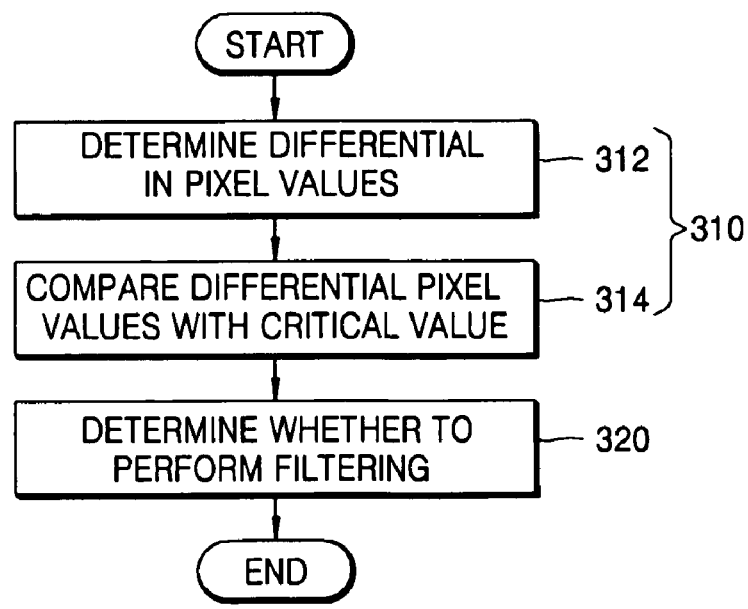
FIG. 3 is a flowchart of a loop filtering method according to another exemplary embodiment of the present invention.

FIG. 3 is a flowchart of a loop filtering method according to another exemplary embodiment of the present invention. Referring to FIG. 1, in operation 310, it is determined whether characteristic edges exist along a boundary between a pair of adjacent blocks based on a difference between the values of each pair of adjacent pixels near the boundary.

Characteristic edges are strong edges, i.e., portions of an image which are likely to be distorted when loop-filtered, and particularly, when smooth-filtered. In order to prevent distortion, loop filtering may not be performed on the boundary if characteristic edges are located along the boundary.

Operation 310 includes operations 312 and 314. In operation 312, the difference between the values of each pair of adjacent pixels near the boundary is calculated. Here, pixel values may mean brightness.

In operation 314, it is determined whether the calculated difference is larger than a predetermined threshold value, and then it is determined whether characteristic edges are located along the boundary based on the determination results. If the calculated difference is larger than the predetermined threshold value, it is determined that characteristic edges are located along the boundary. Otherwise, it is determined that no characteristic edges are located along the boundary.

The difference between the values of each pair of adjacent pixels near the boundary is calculated using a one-dimensional (1D) linear arithmetic operator. The 1D linear arithmetic operator uses a 1D filtering window 430 of FIG. 4. During the operation of the 1D linear arithmetic operator, a pair of adjacent pixels (P_R0 and P_L0 of FIG. 4) on either side of a boundary (440 of FIG. 4) between a pair of adjacent blocks, a pair of adjacent pixels (P_L0 and P_L1 of FIG. 4) on one side of the boundary, and a pair of adjacent pixels (P_R0 and P_R1 of FIG. 4) on the other side of the boundary are set.

The predetermined threshold value is determined by a user and then recorded on two threshold value maps, i.e., first and second threshold value maps (or ∀ and ∃ maps). The first threshold value map stores first threshold values to be compared with respective differences between the values of pairs of adjacent pixels with a block boundary located therebetween, and the second threshold value map stores second threshold values to be compared with a difference between the values of each pair of adjacent pixels in one block. Each of the first and second threshold value maps has two 1D arrays. The length of each of the 1D arrays corresponds to the range of a quantization step QP. The length of each of the 1D arrays has a default value of 64.

Index values indexA and indexB of the first and second threshold value maps are dependent on the quantization step QP. In other words, the index values indexA and indexB of the first and second threshold value maps correspond to the quantization step QP.

In another exemplary embodiment of the present invention, two filtering offsets OS may be manually set in order to easily adjust the degree of filtering. In the present exemplary embodiment, each of the index values indexA and indexB of the first and second threshold value maps is equal to a result of summing up the quantization step QP and the filtering offsets OS. Each of the filtering offsets OS has a default value of 0.

In other words, two threshold values ∀ and ∃, which are respectively obtained from the first and second threshold value maps (or the ∀ and ∃ maps) using the quantization step QP and the filtering offsets OS, are only used as restraints when generating the index values indexA and indexB of the first and second threshold value maps. In the case of selecting a filtering unit to be used for filtering a block, the threshold values ∀ and ∃ are respectively extracted from the first and second threshold value maps and then used in operation 320 of determining whether to perform loop filtering on the block.

In operation 320, if characteristic edges are located along the boundary, a loop filtering operation is performed, and otherwise, loop filtering is not performed.

Figure 4:
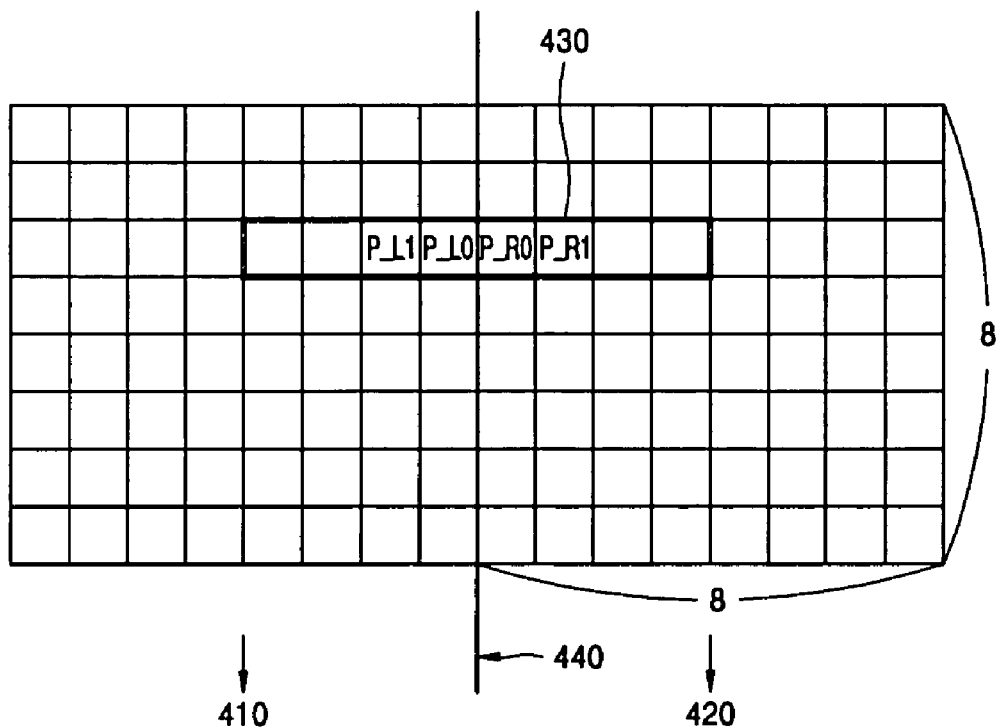
FIG. 4 is a diagram illustrating operation 310 of FIG. 3.

FIG. 4 is a diagram illustrating operation 310 of FIG. 3. Referring to FIG. 4, reference numeral 410 is a current block to be filtered, reference numeral 410 is a block horizontally adjacent to the current block 420, reference numeral 430 represents a filtering window, and reference numeral 440 represents a boundary between the current block 420 and the block 410 horizontally adjacent to the current block 420.

Even though FIG. 4 illustrates an example of the application of operation 310 to a pair of horizontally adjacent blocks, operation 310 is also applicable to a pair of vertically adjacent blocks.

A first differential pixel value C1, a second differential pixel value C2, and a third differential pixel value C3 are calculated using Equations (1), (2), and (3), respectively:

$$C1 = R0 - L0 \qquad (1);$$

$$C2 = R0 - R1 \qquad (2); \text{ and}$$

$$C3 = L0 - L1 \qquad (3)$$

where R0, R1, L0, and L1 are the values of the pixels P_R0, P_R1, P_L0, and P_L1, respectively.

In other words, the first differential pixel value C1 is obtained by subtracting the pixel value L0 from the pixel value R0, the second differential pixel value C2 is obtained by subtracting the pixel value R1 from the pixel value R0 and the third differential pixel value C3 is obtained by subtracting the pixel value L1 from the pixel value L0.

If the first differential pixel value C1 is smaller than the threshold value ∀ (i.e., C1<∀), the second differential pixel value C2 is smaller than the threshold value ∃ (i.e., C2<∃), and the third differential pixel value C3 is also smaller than the threshold value ∃ (i.e., C3<∃), then it is determined that no characteristic edges are located along the boundary in operation 310, and thus filtering may be performed. Otherwise, however, filtering must not be performed.

In average filtering, the values of a pair of pixels on one side of a block boundary and a pair of pixels on the other side of the block boundary are adjusted by assigning new values to the two pairs of pixels using a window filtering formula. In the window filtering formula, an edge input value is determined based on the values of a total of eight pixels enclosed by a solid line in FIG. 4.

Referring to FIG. 4, the filtering window 430 includes the two pairs of pixels (P_R0 and P_R1) and (P_L0 and P_L1) with the block boundary 440 located therebetween. A new pixel value R0' assigned to the pixel P_R0 for average filtering is calculated using Equation (4):

$$R0' = \frac{1}{4}(R1 + 2R0 + L0). \qquad (4)$$

New pixel values L1', L0', and R1' assigned to the pixels P_L1, P_L0, and P_R1, respectively, are calculated using the same weight coefficients as in Equation (4), i.e., according to $$L0' = \frac{1}{4}(R0 + 2L0 + L1), \; R1' = \frac{1}{4}(R0 + L0 + 2R1), \text{ and}$$

$$L1' = \frac{1}{4}(R0 + L0 + 2L1).$$

In differential filtering, the values of two adjacent pixels on a block boundary are adjusted by adding a predetermined adjustment value to them or subtracting the predetermined adjustment value from them. The predetermined adjustment value is determined such that the difference value between the adjacent pixels can be reduced enough to get rid of all visual blocking effects.

In differential filtering, the two pairs of pixels with the block boundary located therebetween are processed as follows. A predetermined 1D pixel is average-filtered, and the predetermined adjustment value is added to or subtracted from the values of pixels adjacent to the predetermined 1D pixel. The adjustment value is obtained using a 1D filtering window having weight coefficients (1, −3, 3, −1). Thereafter, the predetermined adjustment value is added to a pixel in a pair of pixels and is subtracted from the other pixel in the pair of pixels. For example, values $l_0'$ and $r_0'$ of the pixels P_L0 and P_R0 obtained through differential filtering are calculated using Equations 5 through 7:

$$\text{delta} = [\{(+1)l_1 + (-3)l_0 + (+3)r_0 + (-1)r_1\} + 4] >> 3 \quad (5)$$
$$= \{(r_0 - l_o) \times 3 + (l_1 - r_1) + 4\} >> 3$$

$$l_0' = l_0 + \text{delta} \quad (6)$$

$$r_0' = r_0 - \text{delta} \quad (7)$$

where $l_0$ and $r_0$ are the values of the pixels P_L0 and P_R0 yet to be adjusted through differential filtering, and delta is the predetermined adjustment value.

Average filtering and differential filtering are performed in a horizontal direction and then in a vertical direction. Detailed processes of average filtering and differential filtering are widely known to one of ordinary skill in the art.

Figure 5:
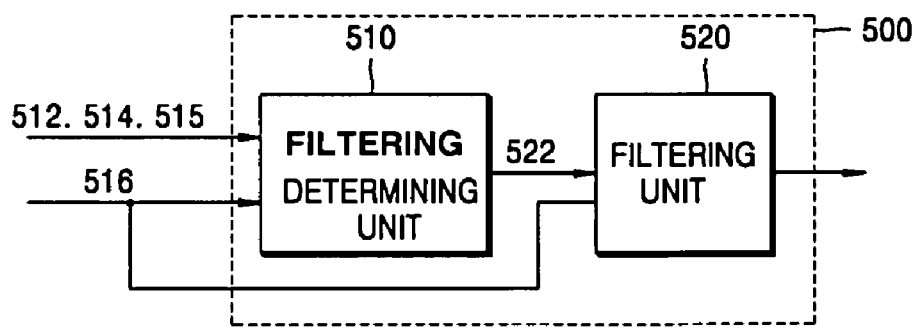
FIG. 5 is a block diagram of a loop filtering apparatus according to an exemplary embodiment of the present invention.

FIG. 5 is a block diagram of a loop filtering apparatus according to the present invention.

Referring to FIG. 5, a loop filtering apparatus 500 includes a filtering determining unit 510 and a filtering unit 520.

The filtering determining unit 510 receives coding type information 512, a motion vector 514, reference frame information 515, and an image frame 516, and generates a filtering unit selection signal 522, which is indicative of a filtering unit to be used for filtering a corresponding image.

The filtering unit 520 determines a filtering unit to be used based on the filtering unit selection signal 522 and filters the image frame 516 using the determined filtering unit.

Figure 6:
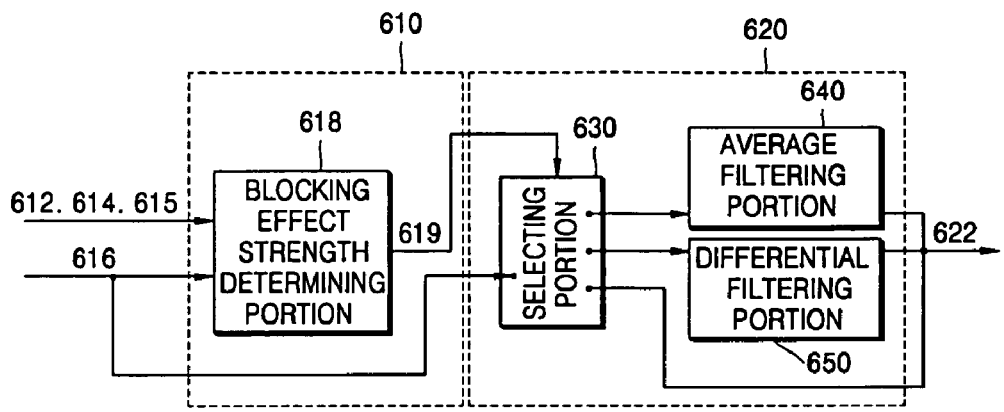
FIG. 6 is a block diagram of a loop filtering apparatus according to an exemplary embodiment of the present invention.

FIG. 6 is a block diagram of a loop filtering apparatus according to an exemplary embodiment of the present invention.

A filtering determining unit 610 in FIG. 6 includes a blocking effect strength determining portion 618, and a filtering unit 620 in FIG. 6 includes a selecting portion 630, an average filtering portion 640, and a differential filtering portion 650.

The blocking effect strength determining portion 618 calculates blocking effect strength 619 based on coding type information 612, which identifies the type of coding on a corresponding block, that is, the type of a macroblock to which the corresponding block belongs, a motion vector 614 of the block in the corresponding macroblock, and reference frame information 615, which is information regarding a reference frame.

The blocking effect strength 619 is calculated according to the following method.

① If one or two blocks in a 8×8 block on each side of a block boundary are intra-prediction blocks, i.e., if the coding type information specifies intra-coding, the blocking effect strength is 2.

② If at least one of the following conditions is met, the blocking effect strength is 1:

a. The two 8×8 blocks on each side of the block boundary use different reference frames, which are image frames referred to in inter-coding; and b. The two 8×8 blocks on each side of the block boundary use the same reference frame, but a difference of components among two motion vectors is larger than a complete pixel value.

③ If none of ① and ② is satisfied, the blocking effect strength is 0.

The selecting portion 630 selects one of the average filtering portion 640 and the differential filtering portion 650 based on the blocking effect strength 619, and transfers an image frame 616 to the selected filtering unit. The image frame 616 includes the values of pixels belonging to the 8×8 blocks. If no filtering unit is selected, the image frame 616 is output without being filtered.

The filtering unit is selected according to the following criteria.

If the blocking effect strength is 2 (this means that the blocking effect is distinct), strong filtering, that is, average filtering should be performed. If the blocking effect strength is 1 (this means that the blocking effect is not distinct), weak filtering, that is, differential filtering should be performed. Also, if the blocking effect strength is 0 (this means that no blocking effect exists), no filtering should be performed.

The average filtering portion 640 performs average filtering on the image frame 616, thus generating an output signal 622, and the differential filtering portion 650 performs differential filtering on the image frame 616, thus generating an output signal 622.

Figure 7:
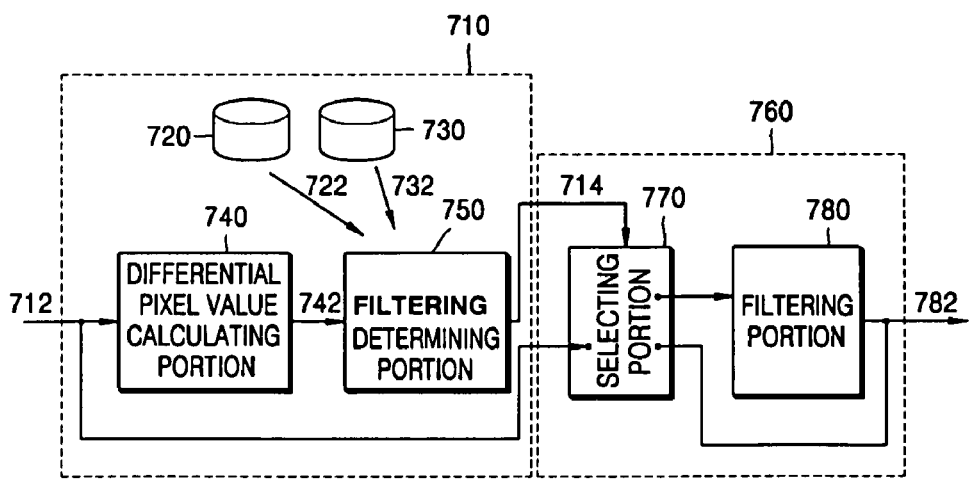
FIG. 7 is a block diagram of a loop filtering apparatus according to another exemplary embodiment of the present invention.

FIG. 7 is a block diagram of a loop filtering apparatus according to another exemplary embodiment of the present invention.

A filtering determining unit 710 in FIG. 7 includes a first threshold value map 720, a second threshold value map 730, a differential pixel value calculating portion 740, and a filtering determining unit 750. A filtering unit 760 in FIG. 7 includes a selecting portion 770 and a filtering portion 780.

The differential pixel value calculating portion 740 receives an image frame 712, generates a differential pixel difference 742, i.e., a difference of two pixel values, and then transmits the differential pixel value to the filtering determining unit 750. The differential pixel value 742 includes a first differential pixel value, a second differential pixel value, and a third differential pixel value. The first differential pixel value is a difference in the values of pixels in adjacent different blocks, and the second and third differential values are differences in the values of pixels in the same block. Refer to Equations 1 through 3 described above for the first through third differential pixel values.

According to the exemplary embodiments, three types of differential pixel values can be used: one type is obtained by performing a gradient operation on a pair of pixels located on opposite two sides of a block boundary using a gradient operator (1, −1), and the other types are obtained by performing a gradient operation on two pairs of pixels in one block using a gradient operator (1, −1). When filtering is performed in a horizontal direction, a gradient operation is performed on pixels located in a horizontal direction. When filtering is performed in a vertical direction, a gradient operation is performed on pixels located in a vertical direction. For example, the first differential pixel value C1 is obtained by performing subtraction using the values of pixels located on opposite two sides of a block boundary and then taking an absolute value of the subtracted result, and second and third differential pixel values C2 and C3 are obtained by performing subtraction using the values of pixels in the same block and then taking the absolute values of the subtracted results.

The first threshold value map 720 includes threshold values for differences in the values of pixels in adjacent different blocks, and the second threshold value map 730 includes threshold values for differences in the values of pixels in the same block. Array values of the first and second threshold value maps 720 and 730 are quantization steps. A first threshold value and a second threshold value are set by a user.

According to a modified exemplary embodiment, first and second threshold value maps can be generated considering a filtering control offset. That is, an index value of a threshold value map is not a quantization step but the sum of a filtering control offset and a quantization step. In this case, a threshold value map is determined according to the following processes: 1) averaging the quantization steps of two blocks located on opposite two sides of a block boundary to obtain an average quantization step, 2) adding a predetermined filtering control offset to the average quantization step to generate an index value, and 3) matching the index value and threshold values predetermined by a user to generate the threshold value map.

The filtering determining unit 750 generates a filtering determining signal 714 based on the first threshold value 722, the second threshold value 732, and the differential pixel value 742. The filtering determining signal 714 is a signal indicating whether or not filtering should be performed, and represents whether or not a characteristic edge exists on a corresponding block boundary.

For example, the filtering determining unit 750 generates a filtering determining signal 714 (=1), if the first differential pixel value C1 is smaller than a first threshold value a (C1<α), the second differential pixel value C2 is smaller than a second threshold value β (C2<β), and the third differential pixel value C3 is smaller than the second threshold value β (C3<β). Otherwise, the filtering determining unit 750 generates a filtering determining signal 714 (=0). Here, the filtering determining signal 714 (=1) indicates that filtering should be performed.

The selecting portion 770 determines whether to transmit the image frame 712 to the filtering unit 780 or directly output the image frame 712 as an output signal 782 not via the filtering unit 780 based on the filtering determining signal 714. For example, if the filtering determining signal 714 is 1, the selecting portion 770 transmits the image frame 712 to the filtering unit 780.

The filtering unit 780 receives the image frame 712 from the selecting portion 770 and performs filtering on the image frame 712, thus generating an output signal 782.

In this specification, details for implementing a video encoder according to the present invention are described. The loop filter 140 according to the present invention is suitable for use in both encoder and decoder. Details for implementing an encoder and a decoder according to the present invention are particularly focused on 8×8 blocks and can be applied to an AVS encoder or decoder according to international standards. The present invention can be also applied to H.264 and MPEG4 standards.

Meanwhile, the loop filtering method of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and carrier waves.

As described above, according to the present invention, by selectively performing loop filtering or selecting a degree of filtering according to the blocking effect strength or a differential pixel value, it is possible to efficiently remove the blocking effect occurring due to a quantization error in high-frequency coefficients.

In other words, according to the present invention, the blocking effect appearing after encoding can be efficiently removed, so that the quality of images can be improved. Experimentally, a PSNR (Peak Signal-to-Noise Rate) has increased by 0.2 dB. The present invention can be stably applied to an AVS coder for HDTV.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A loop filtering method comprising:
    calculating, in a filtering apparatus, a blocking effect strength based on coding type information which specifies a coding type of a block to be filtered, a motion vector of the block, and reference frame information which identifies a reference frame;
    determining a filtering unit in said filtering apparatus to be used for filtering the block based on the blocking effect strength; and
    performing filtering on the block using the filtering unit which is determined.

2. The loop filtering method of claim 1, wherein the calculating of the blocking effect strength comprises determining the blocking effect strength as a first type if a coding type of at least one of two blocks in a block on one side of a block boundary is intra-coding.

3. The loop filtering method of claim 2, wherein the calculating of the blocking effect strength comprises determining the blocking effect strength as a second type if the coding type of the at least one of the two blocks in the block on the one side of the block boundary is intra-coding and the blocks use different reference frames.

4. The loop filtering method of claim 3, wherein the calculating of the blocking effect strength comprises determining the blocking effect strength as the second type if the coding type of the at least one of the two blocks in the block on the one side of the block boundary is intra-coding, the blocks use different reference frames, and a difference of components among two motion vectors is larger than a complete pixel value.

5. The loop filtering method of claim 4, wherein the calculating of the blocking effect strength comprises determining the blocking effect strength as a third type if the blocking effect strength is not determined as the first type or the second type.

6. The loop filtering method of claim 5, wherein the determining of the filtering unit to be used for filtering the block comprises choosing between an average filtering unit and a differential filtering unit.

7. The loop filtering method of claim 6, wherein the determining of the filtering unit to be used for filtering the block comprises:
    selecting the average filtering unit if the blocking effect strength is determined as the first type;
    selecting the differential filtering unit if the blocking effect strength is determined as the second type; and
    performing no filtering if the blocking effect strength is determined as the third type.

8. The loop filtering method of claim 1, wherein the calculating of the blocking effect strength comprises determining the blocking effect strength based on a characteristic of at least one block among two block that are adjacent to each other.

9. The loop filtering method of claim 1, wherein the reference frames correspond to the frames used as reference by the block.

10. A loop filtering apparatus comprising:
- a blocking effect strength calculating portion which calculates a blocking effect strength based on coding type information which represents a coding type, a motion vector of the block, and reference frame information for identifying a reference frame;
- a selecting portion which selects a type of filtering to perform based on the blocking effect strength; and
- a filtering portion which performs the type of filtering which is selected.

11. The loop filtering apparatus of claim 10, wherein the filtering portion is one of an average filtering portion which performs average filtering, and a differential filtering portion which performs differential filtering.

12. The loop filtering apparatus of claim 10, wherein, if a coding type of at least one of two blocks located on one side of a block boundary is intra-coding, the blocking effect strength calculating portion determines the blocking effect strength as a first type.

13. The loop filtering apparatus of claim 12, wherein, if the coding type of the at least one of the two blocks located on the one side of the block boundary is inter-coding and the blocks uses different reference blocks, the blocking effect strength calculating portion determines the blocking effect strength as a second type.

14. The loop filtering apparatus of claim 13, wherein, if a coding type of the at least one of the two blocks located on the one side of the block boundary is inter-coding, the blocks uses different reference frames, and a difference of components among two motion vectors in the blocks is greater than a complete pixel value, the blocking effect strength calculating portion determines the blocking effect strength as the second type.

15. The loop filtering apparatus of claim 14, wherein the blocking effect strength calculating portion determines the blocking effect strength as a third type if the blocking effect strength is not determined as the first type or the second type.

16. The loop filtering apparatus of claim 15, wherein the selecting portion selects an average filtering portion as a filtering unit to be used if the blocking effect strength is the first type, selects a differential filtering portion as a filtering unit to be used if the blocking effect strength is the second type, and selects no filtering portion if the blocking effect strength is the third type.

17. A computer-readable storage medium having embodied thereon a computer program for executing a loop filtering method, the loop filtering comprising:
- calculating a blocking effect strength based on coding type information which specifies a coding type of a block to be filtered, a motion vector of the block, and reference frame information which identifies a reference frame;
- determining a filtering unit to be used for filtering the block based on the blocking effect strength; and
- performing filtering on the block using the filtering unit which is determine.

* * * * *